United States Patent [19]

Koppel

[11] Patent Number: 5,697,212

[45] Date of Patent: Dec. 16, 1997

[54] ROCKET PROPELLANT TANK SELF-PRESSURIZATION

[75] Inventor: Christophe Koppel, Nandy, France

[73] Assignee: Societe Europeenne de Propulsion, Suresnes, France

[21] Appl. No.: 577,647

[22] Filed: Dec. 22, 1995

[30] Foreign Application Priority Data

Dec. 27, 1994 [FR] France ................... 94 15695

[51] Int. Cl.$^6$ ........................................... F02K 9/50
[52] U.S. Cl. ................... 60/259; 60/39.48; 60/39.462
[58] Field of Search ........................ 60/39.48, 39.462, 60/218, 259, 260, 734, 726, 749; 417/151

[56] References Cited

U.S. PATENT DOCUMENTS

| | | | |
|---|---|---|---|
| 2,683,963 | 7/1954 | Chandler | 60/35.6 |
| 2,704,438 | 3/1955 | Sheets | 60/259 |
| 2,858,670 | 11/1958 | Grieve et al. | 60/259 |
| 3,138,928 | 6/1964 | Oppenheimer et al. | 60/39.48 |
| 3,176,465 | 4/1965 | Colley, Jr. | 60/749 |
| 3,379,011 | 4/1968 | Von Ohain et al. | 60/260 |
| 3,431,742 | 3/1969 | Green | 60/39.48 |
| 3,507,296 | 4/1970 | Fix et al. | 60/39.48 |
| 3,540,216 | 11/1970 | Quillevere et al. | 60/749 |
| 3,570,249 | 3/1971 | Baum et al. | 60/259 |
| 3,672,165 | 6/1972 | Baum | 60/39.48 |
| 3,898,794 | 8/1975 | Ariga | 60/259 |

FOREIGN PATENT DOCUMENTS

| | | | |
|---|---|---|---|
| 215651 | 1/1958 | Australia | 60/39.48 |
| 508930 | 7/1953 | Belgium | |
| 2197117 | 3/1974 | France | |
| 2016263 | 7/1994 | Russian Federation | 417/151 |
| 793689 | 5/1954 | United Kingdom | 60/260 |
| 2025532 | 1/1980 | United Kingdom | 60/259 |

Primary Examiner—Timothy Thorpe
Assistant Examiner—Ted Kim
Attorney, Agent, or Firm—Weingarten, Schurgin, Gagnebin & Hayes LLP

[57] ABSTRACT

A device for pressurizing at least one propellant tank feeding the combustion members of a space vehicle, the tank(s) being connected to one or more pipes for feeding said combustion members, and at least one of the propellants being catalytically or thermally decomposable, the device comprising: tapping means placed at the outlet from the decomposable propellant tank to tap a portion of said propellant, drive gas generation means for delivering drive gases, suction means formed by a converging-diverging nozzle connected firstly to the drive gas generation means and secondly to the tapping means to suck decomposable propellant from the tapping means by lowering the pressure of the drive gases to a value that is less than that required for pressurizing the tank(s), and decomposition means placed at the outlet from the suction means for decomposing the sucked propellant into pressurization gas for pressurizing the tank(s).

12 Claims, 3 Drawing Sheets

ROCKET PROPELLANT TANK SELF-PRESSURIZATION

FIELD OF THE INVENTION

The present invention relates to devices for pressurizing propellant tanks in space vehicles of all types, in particular maneuverable launchers, and more particularly those in which it is desired to deliver gas in varying quantities with greater safety, greater performance, and a wider range of possible flow rates.

PRIOR ART

Conventionally, propellant tanks are pressurized from high pressure supplies containing an inert pressurization gas (e.g. helium) and connected to the propellant tanks via expanders.

Nevertheless, such conventional devices suffer from the drawbacks firstly of presenting large mass which restricts use thereof for small propulsion systems, and secondly of posing safety problems given the high pressures used in such supplies.

U.S. Pat. No. 3,740,945 (Thiokol Chemical Corporation, Joseph J. Lovingham) attempts to provide a solution to the unwanted presence in certain applications of such high pressure supplies by proposing to pressurize propellant tanks directly from hot gases and not from cold gases coming from such an external high pressure supply. These hot gases are obtained from a differential piston whose volume in front of its active face is filled with a catalytically decomposable propellant (such as hydrogen peroxide). Piston displacement under drive from a firing device (a block of powder) causes the propellant to be injected into a gas generator within which it is decomposed on a bed of catalyst (e.g. based on silver) to be converted into hot gases which go to pressurize the propellant tanks directly.

Nevertheless, that structure is still not entirely free from defects. Because there are piston rings associated with the differential piston, the sealing of such a system for long-term storage is not guaranteed, and that is particularly harmful for devices in which it is desired to implement tank pressurization only after a relatively long period of time. Also, it is necessary for the volume of propellant associated with the piston to be determined as a function of the total duration of the mission performed by the space vehicle, thereby making the system bulky. Further, just like in the main tank(s), the propellant contained in the differential piston must be treated with the same safety precautions, which requires in particular the use of a leakage detector having triplicated majority logic or a filling orifice that is sealed in redundant manner, for example.

DEFINITION OF THE INVENTION

The present invention thus proposes providing a system for pressurizing propellant tanks by using hot gases while avoiding the drawbacks of the prior art and that is particularly suitable for high performance systems (i.e. of low mass) requiring a high level of safety (no supplies under high pressure) and capable of long term storage in space or on the ground.

These objects are achieved by a device for pressurizing at least one propellant tank feeding the combustion members of a space vehicle, the tank(s) being connected to one or more pipes for feeding said combustion members, wherein when at least one of the propellants is catalytically or thermally decomposable, the device comprises: tapping means placed at the outlet from the decomposable propellant tank to tap a portion of said propellant, drive gas generation means for delivering drive gases, suction means formed by a converging-diverging nozzle connected firstly to the drive gas generation means and secondly to the tapping means to suck decomposable propellant from the tapping means by lowering the pressure of the drive gases to a value that is less than that required for pressurizing the tank(s), and decomposition means placed at the outlet from the suction means for decomposing the sucked propellant into pressurization gas for pressurizing the tank(s).

By pressurizing propellant tanks directly from said tanks (whence the inventor's term "self-pressurization device"), there is no need to use any external supply under high pressure (thus increasing safety), nor is there any need for additional auxiliary devices (thus improving performance and reliability) such as differential pistons that increase the total on-board mass and that also contain moving parts running the risk of jamming. Long-term storage and safety are thus guaranteed, thereby imparting very high performance to a space vehicle having such a pressurization circuit.

The means for generating a drive gas may be constituted directly by a gas generator of the space vehicle, or preferably by a powder cartridge that delivers a combustion flow that is constant or that varies slowly.

The converging-diverging nozzle receiving the drive gases from the generator means opens out into an expansion chamber into which the decomposable propellant is also delivered by means of an injection tube. The propellant injection tube may have an outlet orifice directed in the opposite direction to the flow of drive gas, a deflector placed facing said outlet orifice enabling the propellant to be reversed into the drive gas flow direction. In a preferred embodiment, the decomposable propellant injection tube may have one or more outlet orifices opening out annularly into the expansion chamber in a direction that is substantially tangential to the drive gas flow direction.

In various embodiments, the expansion chamber may be closed by a subsonic throat opening out directly into a pressurization duct or by a supersonic throat likewise opening out into a pressurization duct.

In addition, regulation means are provided to ensure pressure equilibrium throughout the pressurization circuit. These regulation means may comprise a non-return valve or an electrically-controlled valve which is opened by a control circuit in response to pressure values existing across said valve and delivered by upstream and downstream sensors.

An initialization device may also be provided to enable initial pressurization of the propellant tank(s). The presence of such an initialization device depends on the performance of the vehicle, and in particular the duration of its initialization stage (time required to go from a storage state with no pressure to an operational state with pressure at its nominal level). If it is desired for this duration to be very short, it is possible to generate hot gases very quickly with a "booster" powder block and thus to initialize the system quickly. In contrast, if the duration of the initialization stage is less "critical", then this powder block is not essential and the device can be capable on its own of providing both initialization and pressurization in an operational state.

BRIEF DESCRIPTION OF THE DRAWINGS

Other characteristics and advantages of the present invention appear more clearly from the following description given by way of non-limiting indication and made with reference to the accompanying drawings, in which.

DETAILED DESCRIPTION

Figure 1:
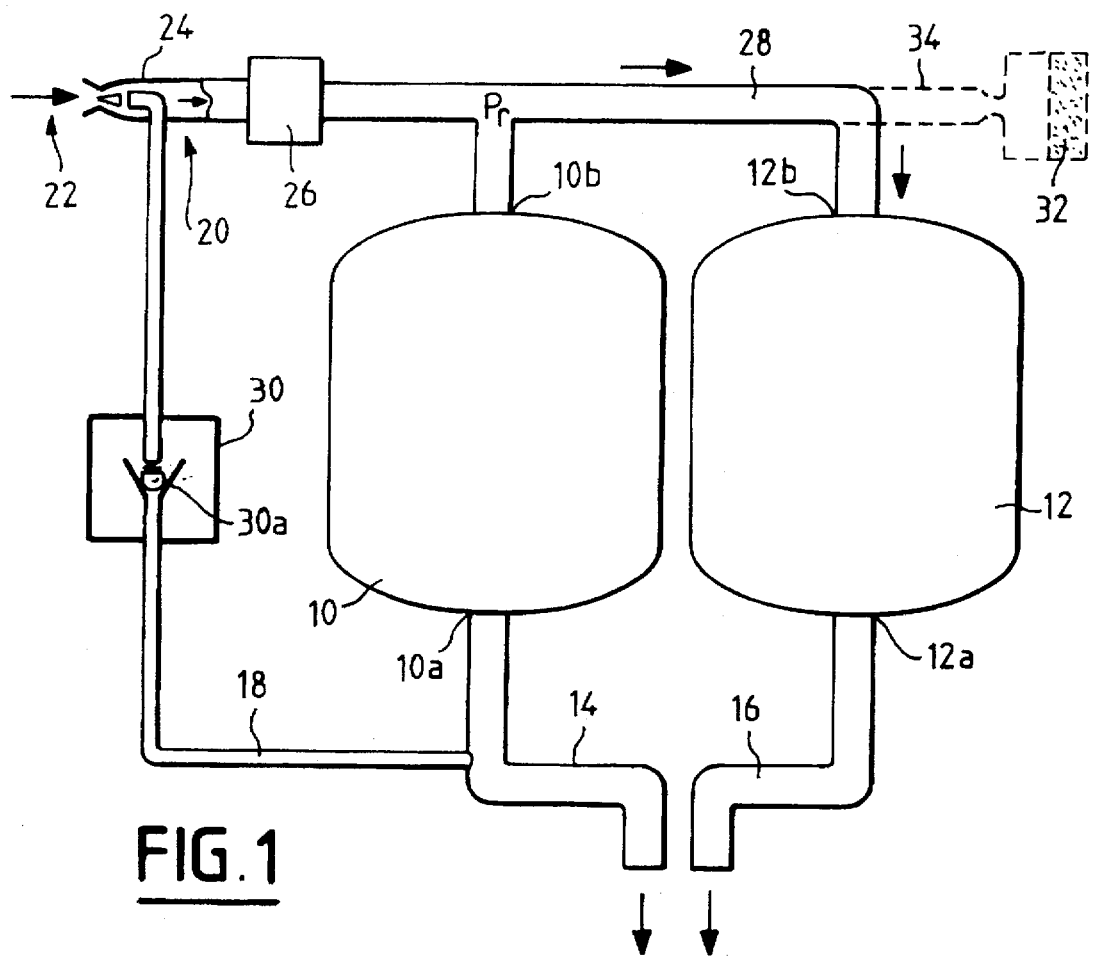
FIG. 1 shows a first embodiment of a self-pressurization system of the invention.

FIG. 1 shows an embodiment of a system of the invention for pressurizing propellant tanks, e.g. of a maneuverable space vehicle. In order to limit the description only to characteristic elements of the invention, the other components of the space vehicle have deliberately been omitted, including its combustion members such as the combustion chambers of its various engines or thrusters (advance, braking, attitude, lateral displacement), but those members naturally participate in the general operation of such a space vehicle.

In the example shown, the engines are of the kind fed with two liquid propellant components, loosely referred to as "propellants". A first propellant is available in a first tank 10, and this propellant needs to be thermally or catalytically decomposable, e.g. monomethyl hydrazine (MMH) or unsymmetrical dimethyl hydrazine (UDMH), or hydrazine, or indeed oxygenated water, and with a second propellant available in a second tank 12 (e.g. nitrogen peroxide $N_2O_4$ or kerosene).

Each of the two tanks 10, 12 has an outlet orifice 10a, 12a connected to a pipe 14, 16 for feeding the engines (not shown). A duct 18 terminating in the pipe 14 downstream from the outlet orifice 10a of the first tank 10 containing a decomposable or vaporizable propellant serves to tap a fraction of this propellant which, after being decomposed by suction and decomposition means 20 provides a pressurization gas for pressurizing the tanks 10 and 12, including specifically the tank from which it was taken, thereby providing a looped pressurization circuit. The suction and decomposition means 20 are described in detail below and they comprise means 22 for generating a drive gas, preferably a hot gas, which means may be constituted by a gas generator of the space vehicle, suction means 24 for lowering the pressure of the gas obtained in this way to a pressure that is lower than the pressures in the tanks, thereby enabling the tapped propellant to be extracted, and means 26 for decomposing the decomposable propellant into a gas under the effect of the heat provided by the drive gases, and optionally including a thermal or catalytic bed. The pressurization gas obtained at the outlet from the decomposer 26 is then taken to gas inlet orifices 10b and 12b of the propellant tanks 10 and 12 via a pressurization gas feed duct 28. Regulator means 30 placed on the tapping duct 18 for the decomposable first propellant serve to guarantee optimum operation of the system by ensuring that the pressures that obtain within the pressurization circuit are in equilibrium. Depending on the way in which the drive gas is generated, it may be necessary to initialize operation of the self-pressurization system by ensuring initial pressurization of the tanks from an initialization device constituted by a "booster" powder block 32 connected to the pressurization duct 28 by a pipe 34 and serving to achieve fast initial pressurization of the tanks when it is fired.

Figure 2:
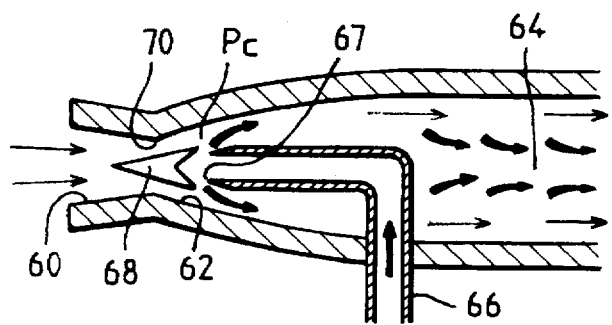
FIG. 2 shows a detail of the propellant suction zone in FIG. 1.

FIG. 2 shows the suction means 24 in detail, which means are constituted by a converging-diverging 60-62 nozzle preceding an expansion chamber 64 into which the drive gases are admitted axially, the decomposable propellant being admitted into the chamber via an angled admission tube 66 that is streamlined and thermally protected, and that has its outlet orifice 67 facing in the opposite direction to the flow of drive gases. A deflector 68 whose outside shape is designed to disturb the flow of drive gases as little as possible is connected to and is placed at the outlet from said tube 66 and enables the flow direction of the propellant to be changed so that it is reversed to flow in the same direction as the drive gas. This deflector is placed directly in the throat 70 of the converging-diverging nozzle.

Operation of the device of the invention can be simply described as follows: once operation has been initialized and sufficient pressure Pr for pressurizing the tanks has been achieved by means of the drive gases or optionally by means of an initialization device 32, the drive gases generated by the gas generator 22 and flowing through the converging-diverging nozzle are accelerated on passing through the throat 70 and in the diverging portion (the pressure Pc of these gases then being lower than the pressure Pr) so as subsequently to be decelerated suddenly (shockwave) or smoothly in the expansion chamber 64, thereby providing a corresponding increase in static pressure and thus reaching a pressure level at the outlet from the chamber that is greater than or equal to Pr. The pressure difference that exists between the expansion chamber at the outlet from the throat or in the diverging nozzle, and the tapping duct for the decomposable first propellant naturally serves to suck this propellant and thus admit it into the expansion chamber. The decomposition means 26 placed at the outlet of said chamber then serve to transform the tapped propellant into a gas (which transformation may be enhanced by the heat delivered by the drive gases if they are hot) for direct pressurization of the tanks 10, 12. The regulation means 30 which may be no more than a non-return valve 30a(also useful during the initialization stage) or which may be an electronic control circuit as explained below, serve to guarantee proper operation of the device overall.

Figure 3:
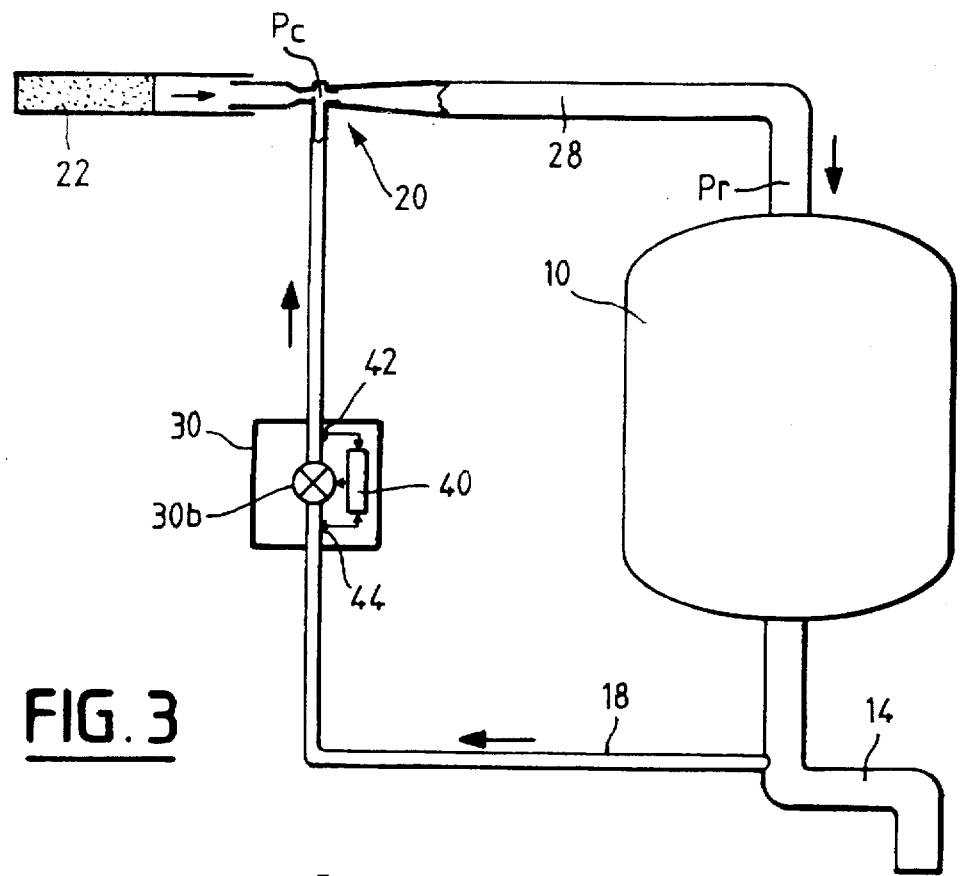
FIG. 3 shows a second embodiment of a self-pressurization system of the invention.
Figure 5:
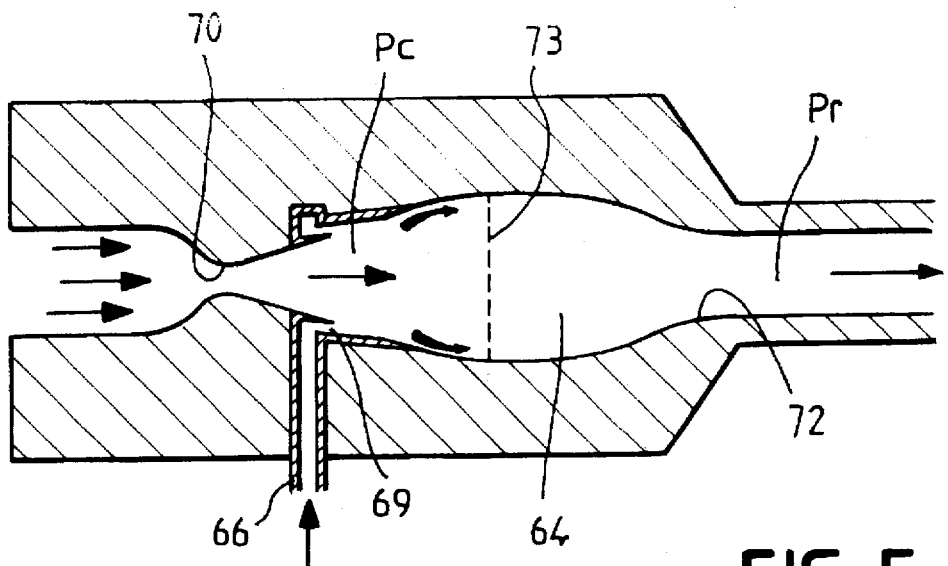
FIGS. 5 and 6 are details showing the propellant suction zones of FIGS. 3 and 4, respectively.

FIG. 3 shows another embodiment of a self-pressurization system of the invention in which the drive gas generator means are constituted by a powder cartridge 22 that provides "cigarette" combustion (i.e. it provides a flow that is constant or slowly varying) and whose combustion duration is designed to correspond exactly to the maximum duration of the mission given to the spacecraft. The regulation means 30 in this embodiment comprise an electrically controlled valve 30b which is opened under the control of an electronic control circuit 40 as a function of pressures measured upstream and downstream of the valve by pressure sensors 44 and 42. The suction means 24 and the decomposition means 26 are constituted by a single expansion chamber whose inlet is constituted by a sonic throat 70 that also acts as a decomposition chamber in the example shown. The throat sections of the nozzle and of the expansion chamber outlet are predetermined in this case to create a shockwave downstream from the sonic throat, thereby giving rise to rapid decomposition of the decomposable first propellant under the effect of the hot drive gases. FIG. 5 shows in greater detail a particular embodiment of the suction zone for the decomposable propellant comprising an admission tube 66 having one or more outlet orifices 69 disposed annularly and substantially tangentially to the flow of drive gases downstream from the sonic throat 70, and an expansion chamber which, in this example is closed by a subsonic second throat 72 constituting the inlet to the pressurization duct 28. In this configuration, the shockwave represented by dashed line 73 is created upstream from the subsonic second throat, but naturally downstream from the sonic first throat. The position of the shockwave 73 depends on the pressure values and consequently it can enable pressures to be regulated automatically. If the pressure of the chamber 64 is too high, then the shockwave can move upstream from the orifices 69, thereby stopping injection.

Figure 4:
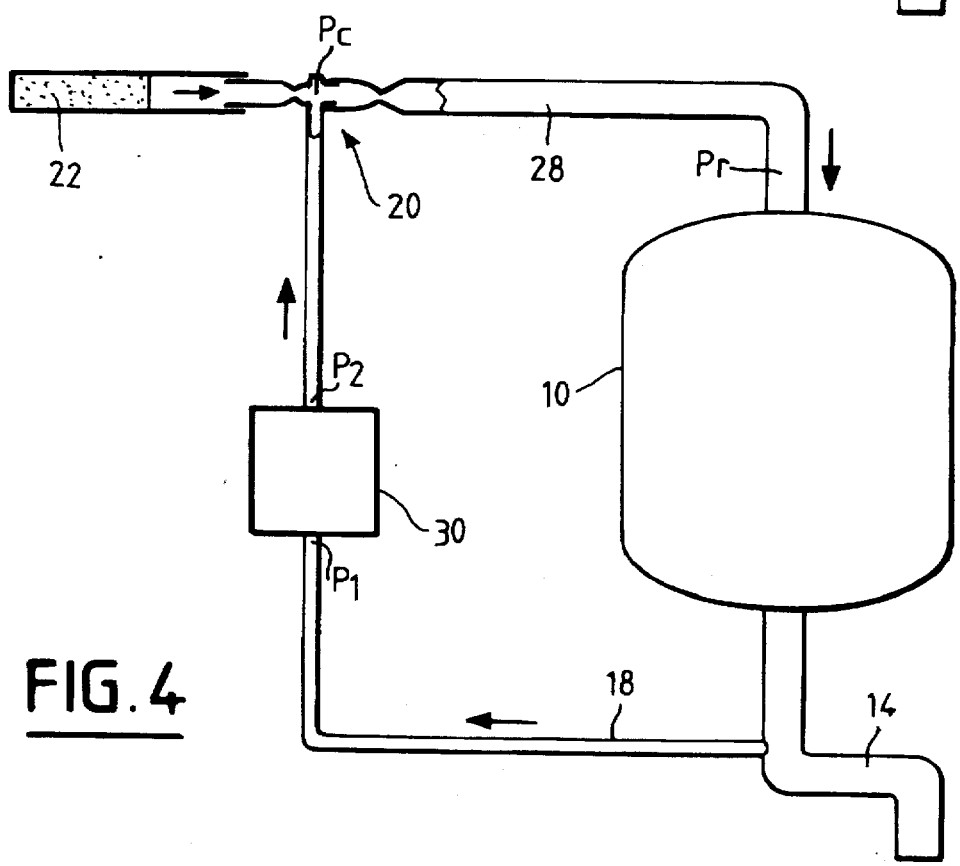
FIG. 4 shows a third embodiment of a self-pressurization of the invention.
Figure 6:
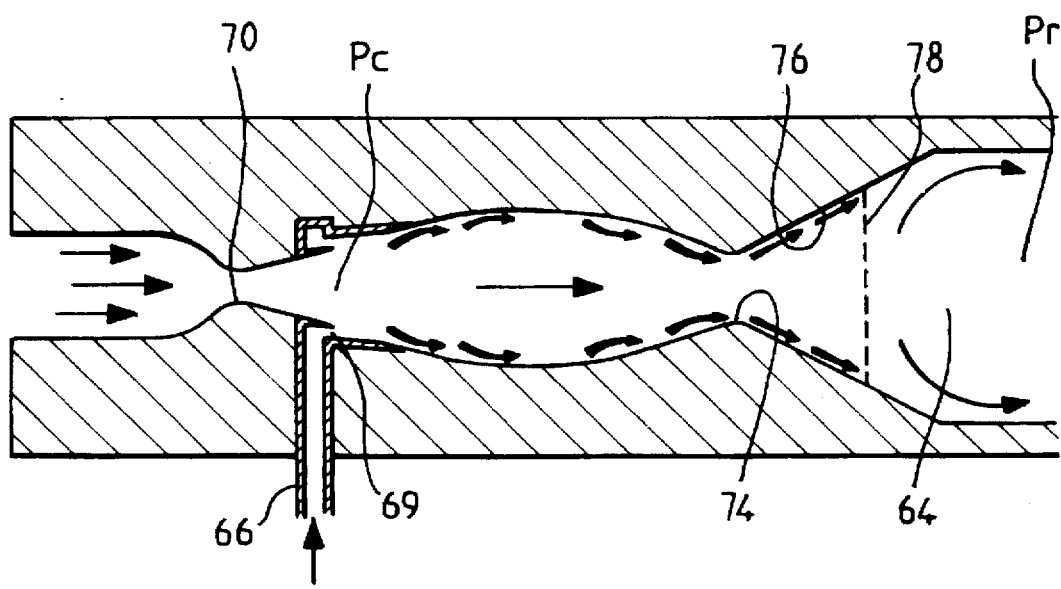

In the embodiment of FIG. 4, the dimensions of the expansion chamber, which in this case also constitutes a decomposition chamber, are designed so that it has a two-throat structure with a sonic first throat 70 and a supersonic second throat 74, followed by an outlet diverging portion 76 within which the shockwave occurs (reference 78 in FIG. 6). As in the preceding embodiments, regulation means 30 placed in the decomposable propellant tapping duct 18 serve to control the various pressures that exist within the pressurization loop. In particular, when the pressure $P_1$ measured upstream from the regulation means by the sensor 44 is greater than the pressure $P_2$ measured downstream from the regulation means by the sensor 32, the electrically controlled valve 30b may open. The control circuit 40 causes it to open providing the pressure $P_1$ is also less than a predetermined reference pressure. Opening the valve 30b enables the decomposable propellant to be injected into the expansion and decomposition chamber where it decomposes, thereby increasing the pressure in the chamber 64 (Pr increases). This increase in pressure then feeds back to the pressure $P_1$ which, on becoming greater than a predetermined reference pressure, causes the control circuit 40 to close the valve 30b. To avoid certain risks of instability in the control loop, inhibit times may conventionally be provided in the logic of the control circuit 40.

With continuing use of the propulsion system fed from the tanks 10 and 12, the pressure $P_1$ drops back below a predetermined reference pressure, thereby causing the valve 30b to be opened again by the control circuit 40, thereby triggering another cycle.

Because of its compactness and the safety it provides, the pressurization circuit described is particularly well adapted to space vehicles and to any device in which it is necessary to store propellant without it being used for a long period of time.

I claim :

1. A device for self-pressurization of at least one propellant tank feeding the combustion members of a space vehicle, the at least one propellant tank being connected to one or more pipes for feeding said combustion members, wherein, when at least one of the propellants is catalytically or thermally decomposable, the device comprising:

tapping means placed at the outlet from the decomposable propellant tank to tap a portion of said propellant;

drive gas generation means for delivering drive gases;

suction means formed by a converging-diverging nozzle connected firstly to the drive gas generation means and secondly to the tapping means to suck decomposable propellant from the tapping means by lowering the pressure of the drive gases to a value that is less than that required for pressurizing the at least one propellant tank; and decomposition means placed at the outlet from the suction means for decomposing the sucked propellant into pressurization gas for pressurizing the at least one propellant tank.

2. A pressurization device according to claim 1, wherein said drive gas generation means are constituted by a gas generator of the space vehicle.

3. A pressurization device according to claim 1, wherein said drive gas generation means are constituted by a powder cartridge that delivers a constant or slowly varying combustion flow.

4. A pressurization device according to claim 1, wherein said converging-diverging nozzle receiving the drive gases from the generation means opens into an expansion chamber into which the decomposable propellant is fed via an injection tube.

5. A pressurization device according to claim 4, wherein said decomposable propellant injection tube has an outlet orifice directed in the opposite direction to the flow of driving gases, a deflector placed facing said outlet orifice enabling said propellant to be reversed into the flow direction of the drive gases.

6. A pressurization device according to claim 4, wherein said decomposable propellant injection tube has one or more outlet orifices opening out annularly into the expansion chamber in a direction that is substantially tangential to the flow of drive gases.

7. A pressurization device according to claim 4, wherein said expansion chamber terminates in a subsonic throat opening out into a pressurization duct.

8. A pressurization device according to claim 4, wherein said expansion chamber terminates in a supersonic throat opening out into a pressurization duct.

9. A pressurization device according to claim 1, further including regulation means for ensuring pressure equilibrium in the pressurization circuit overall.

10. A pressurization device according to claim 9, wherein said regulation means are constituted by a non-return valve.

11. A pressurization device according to claim 9, wherein said regulation means include an electrically controlled valve which is opened by a control circuit in response to pressure values existing across said valve and delivered by an upstream sensor and a downstream sensor.

12. A pressurization device according to claim 1, further including an initialization device for enabling initial pressurization of the at least one propellant tank.

* * * * *